United States Patent [19]

Stewart

[11] Patent Number: 4,534,085
[45] Date of Patent: Aug. 13, 1985

[54] FISH FILLETING SYSTEM

[76] Inventor: Thomas M. Stewart, Rte. 1, Box 283, Denham Springs, La. 70726

[21] Appl. No.: 486,998

[22] Filed: Apr. 21, 1983

[51] Int. Cl.³ .............................................. A22C 25/16
[52] U.S. Cl. .......................................... 17/46; 17/56; 83/817; 83/820
[58] Field of Search ............... 17/56, 46; 83/820, 817, 83/818

[56] References Cited

U.S. PATENT DOCUMENTS

| | | | |
|---|---|---|---|
| 1,639,976 | 8/1927 | Barry | 17/56 |
| 2,822,569 | 2/1958 | Gradoff et al. | 17/56 |
| 2,903,027 | 9/1959 | Edgemond, Jr. et al. | 83/818 X |
| 3,596,308 | 8/1971 | Kenney | 17/56 |
| 4,160,320 | 7/1979 | Wikoff | 83/817 X |

Primary Examiner—Willie G. Abercrombie

[57] ABSTRACT

A fish filleting machine for cutting and separating fish fillets from the central bone section with band saw blades. The machine is designed to require a minimum of non-automatic adjustment in order for the cutter to follow the shape of the hard spinal bone as it cuts through the soft outer layer of fish meat so that a minimum of the fish meat remains on the bone. The machine includes laterally moveable cambered guide wheels to provide a slight, few degree, inner cant or bias to the band saw blades. As the fish to be cut is contacted by the blades, the inwardly directed cant causes the blades to move centrally toward and along the spinal bone, but it is not so canted as to cause the blade to cut into it. The machine includes a variable diameter cam driven means which causes the guide wheels to laterally move into and against the blades providing the desired cant to the band saw blades. The machine also includes laterally directed fish gripping pins on the conveyor chains for automatically gripping the fish body and conveying it securely through the cutting/separating process of the machine.

16 Claims, 9 Drawing Figures

FISH FILLETING SYSTEM

BACKGROUND OF THE INVENTION

1. Field of the Invention

The present invention relates to a machine for separating a softer outer material from an inner harder material and particularly separating fish fillets from fish bone. More particularly the present invention relates to a machine using cutting blades canted inwardly to cut through the soft fish meat with the blades being guided by automatically actuated guide wheels coordinated with a conveyor carrying the fish body between the canted blades, the blade spacing being automatically varied to generally correspond to the thickness of the bone. More particularly the invention relates to a system and machine for filleting fish carried on an endless conveyor using preferably inwardly canted, scalloped band saw blades adjustably and automatically spaced by the machine.

2. Prior Art & General Background

Fish filleting machines of various types are known in the prior art. Operating ideally, these machines are designed to provide boneless, totally edible fillets from a fish processed by the machine.

Various fish filleting machines are known which use band saw blades in order to cut the fillets from the bone. Among these are U.S. Pat. Nos. 2,654,119 issued Oct. 6, 1953 to J. J. Duggan; 1,728,254 issued Sept. 17, 1929 to O. G. Rieske; 3,596,308 issued Aug. 3, 1971 to Leon S. Kenny et al; 1,759,828 issued May 27, 1930 to J. J. Barry; and 1,754,157 issued Apr. 8, 1930 to E. A. Gallison; among others.

| U.S. Pat. No. | Patentee(s) | Issue Date |
| --- | --- | --- |
| 1,552,463 | J. J. Barry | 09/08/25 |
| 1,757,013 | E. A. Gallison | 05/06/30 |
| 1,883,822 | R. Reid et. al. | 10/18/32 |
| 2,210,955 | O. G. Rieske | 08/13/40 |

Filleting fish by machines as well as by hand present the problem of filleting a sufficient number of fish in a certain time period at an efficient cost.

One of the biggest problems with fish filleting machines of the prior art is that of leaving too much fish meat on the discarded central bone section. Several approaches have been taken to this problem, such as for example using blades with adjustable positions, however these have been largely inefficient requiring time to be set for each fish or requiring manual control with constant monitoring of the machine.

Various methods of attempting to avoid this include U.S. Pat. No. 3,596,308, which provided for cutting blades to be set to the approximate size of the fish, these blades being canted outwardly to steadily move out in response to the cant pressing through the fish. The fish was fed backwards, tail first, to so that the smallest diameter bone was presented to the blades first, which then steadily expanded out. This technique, however, may expand out from the bone too quickly and requires too much adjustment prior to feeding fish through the machine.

Another problem with automatic machines is the safe and effective feeding of the fish to be cut. Most mechanisms have used either rollers (note U.S. Pat. No. 3,596,308, for example), or carriages (note U.S. Pat. Nos. 1,754,157 and 2,654,119). These may require adjustment for even small changes in fish size and may require feeding the fish dangerously close to the cutting blades or possible misfeeds close to the cutting blades. The prior art also often required removal of the cut fish too dangerously close to the cutting process.

Additionally the prior art has largely ignored the specifies of the cutting blade, tending to ignore the benefits or drawbacks of specially designed cutting elements.

A further problem addressed by the present invention is keeping the cutting blades and cutting surface free of fish shavings which may foul the cutting process.

It is therefore an object of the invention to rapidly fillet fish, that is to separate the fish meat from the inner fish bone.

It is also an object of the invention to automatically fillet fish leaving less meat on the fish bones than heretofore achieved.

It is also an object of the invention to provide fish fillets for varying sizes of fish with a minimum amount of adjustment being necessary.

It is also an object of the invention to provide a method of filleting fish, which is largely free from fouling during the cutting process and is safe for the operators of the machine.

It is also an object of the invention to provide a fish filleting machine which is relatively compact and transportable, as well as of relatively high speed and through put.

It is also an object to provide a cutting blade selected for maximum efficiency with the present system.

Additional prior patents disclosing fish filleting machines which may be of interest are listed below:

3. General Discussion of the Invention

The present invention addresses these objects by providing a continuous filleting process capable of processing for example fifteen to sixteen fish per minute or possibly more. This rate is approximately ten times faster than the rate fish are processed by hand.

The present invention also addresses the problem of maximizing the amount of meat in the fillets from each fish by providing blades canted inwardly, rather than outwardly or parallel as suggested in the prior art. In this way, as the fish is fed through forwardly head first and tail last, the blades are farthest apart spaced at a distance of approximately the diameter or maximum thickness of the bone. However as the blades enter the fish, the inward cant with the resistance of the fish meat causes the blades to move inwardly until they reach the bone of the fish. The cant is not so great as to cut into the bone, however. It has been found that with the blades used at the speeds of processing used, an angle of two to three degrees for each blade from being parallel to each other is the optimum, any more causing the bone to be cut and any less not providing the automatic self-adjustment by the canted blade desired.

The invention is further automated by having the spacing of the cutting blades adjusted automatically so that, as larger fish are provided, the correction required for the canted blades is minimized.

Additionally, the invention provides for a safe conveyor or system which assures that the fish will be taken through the cutting system properly without undue monitoring by the operator.

This is done by providing a guide in which the fish is placed and over which the fish is conducted for cutting. The fish is placed between opened, vertical pins while on the guide a safe distance from the cutting blades and between opposed conveyor chains.

The pins then close automatically around the fish, holding the fish securely in place and centered for cutting, while toothed or pinned plates on the chains traveling on the chains grasp the fish. The teeth are pointed, but preferably without any hooks, to securely hold the fish without causing undue damage to the fish fillets. After the fish is removed by the pin means on the chains, the vertical pins which firmly held the fish centered, automatically open so that the next fish may be placed in the machine. This all takes place at a significant distance from the cutting blades which assures the safety of the operator.

The toothed plates and opposed chains provide sufficient gripping force to keep the fish from misfeeding, while holding the fish loosely enough to prevent compressing the fish against the cutting blades.

Additionally, the chains and plates serve to carry the fish safely past the cutting process, so that the fillets may be removed without the operator having to come close to the cutting process.

The plates may be made to continue to grip the fish fillets on either side of the bone as they circuit around the gears after the fillets have been cut away from the bone so that the bone is deposited where the chains move apart. The fish fillets are deposited in separate containers after being removed off the pins by scrapers located above the containers for the fillets.

The invention is contained in a frame of unitary construction for easy assembly, while also being compact.

The invention provides for maximum cutting efficiency by using a scallop based saw blade, of the type designed for cutting bread. Scallop blades avoid the problems of adjustment and waste due to the failure to follow the bone which were encountered with the teethed blades of the prior art. Scallop blades also avoid the problems of failing to follow the bone and of moving too slowly encountered with regular knife blades and navy blades.

The invention also provides for keeping the blades and cutting surface clean from cuttings by being equipped with a water spray over the cutting area and which may be turned on during the cutting process to wash both fish and cutting surfaces and saw blades for cleanliness and lubrication.

BRIEF DESCRIPTION OF THE DRAWINGS

For a further understanding of other advantages and of the nature and objects of the present invention, reference should be had to the following detailed description, taken in conjunction with the accompanying drawings in which like parts are given reference numerals and wherein.

DETAILED DESCRIPTION OF THE PREFERRED EMBODIMENT(S)

Figure 1:
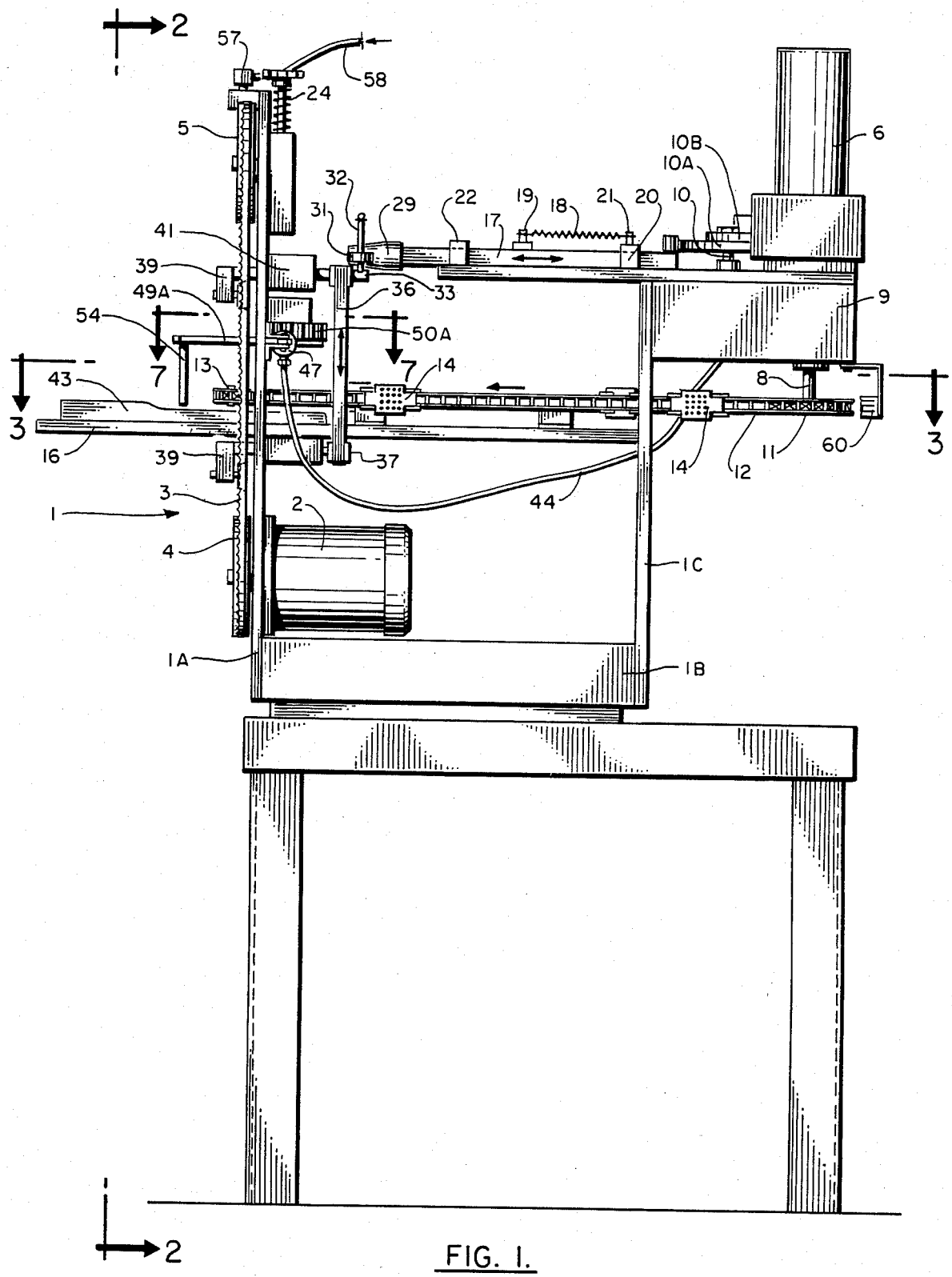
FIG. 1 is a side view of the preferred embodiment of the machine of the present invention.
Figure 3:
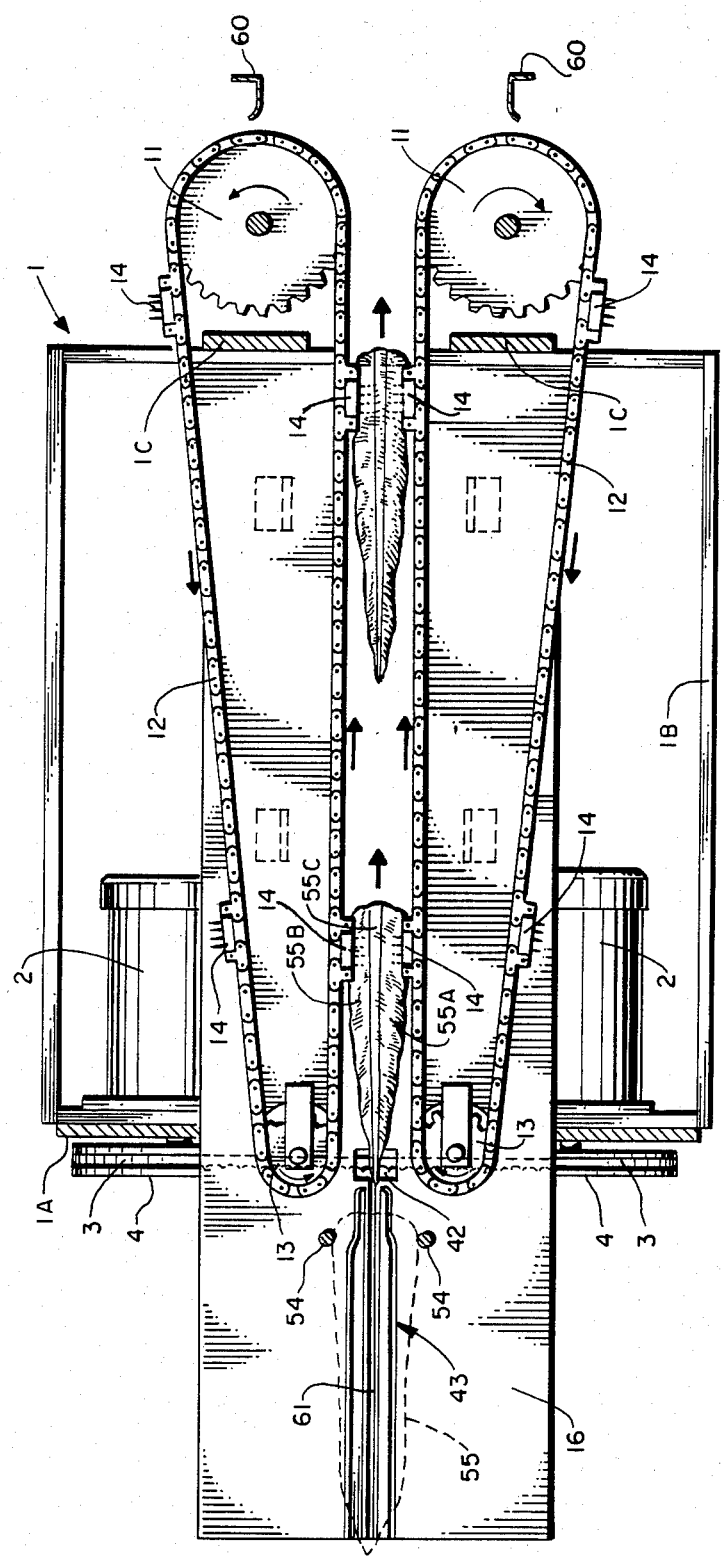
FIG. 3 is a sectional view showing the conveyor system of the machine taken along section lines 3—3 of FIG. 1.

Referring to FIGS. 1 & 3, it can be seen that the preferred embodiment of the machine of the present invention is compactly and completely contained on a single framework 1. Unitary frame 1 includes a front panel 1A, two side panels 1B and two rear panels 1C.

A middle, horizontal panel 16 acts as a floor for the cutting operation and extends out in front of panel 1A. Curved vertical guides 43 are provided along where the middle panel 16 extends through the front panel 1A along the sides of slot 61. As can best be seen with reference to FIG. 2, an entrance opening has been provided in the front panel 1A through which middle panel 16 extends.

Figure 4:
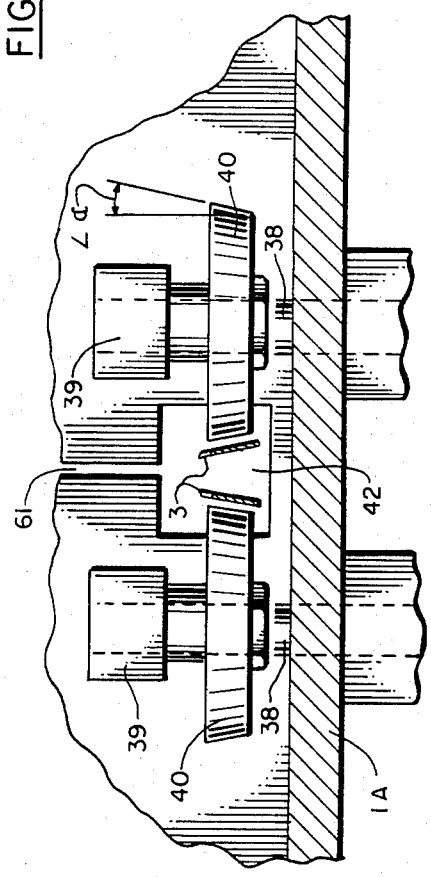
FIG. 4 is a sectional, close-up, partial view of the machine showing the beveled or canted guiding wheels taken along section lines 4—4 in FIG. 2.

As can best be seen in FIGS. 3 & 4, middle panel or floor 16 is separated into two halves with spacing 61 between them where it extends past front panel 1A. The base panel 16 has an enlarged opening 42 where saw blades 3 pass between the halves of the base panel 16 to accommodate the band saw blades 3 at their widest spacing.

Figure 2:
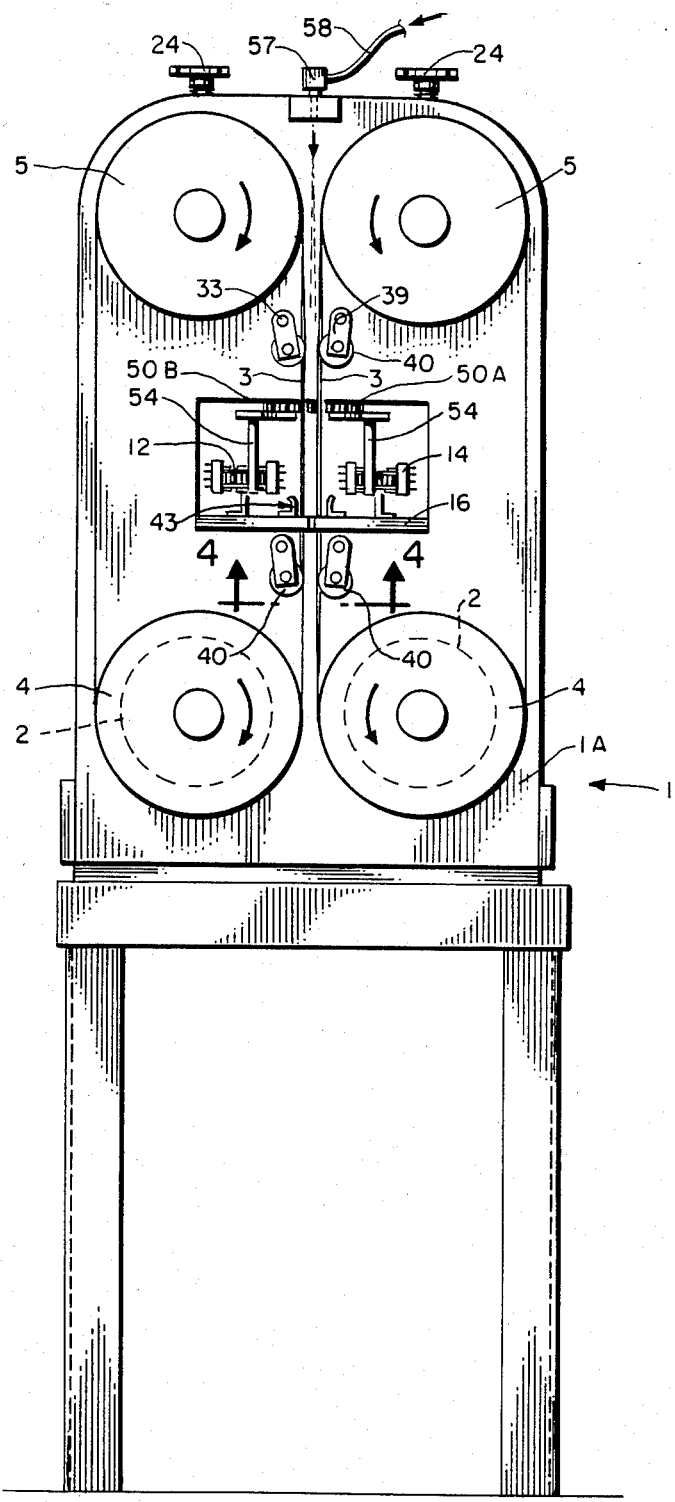
FIG. 2 is an end view of the "front" of the preferred embodiment, taken along perspective lines 2—2 of FIG. 1.

Referring back to FIGS. 1 & 3 and also to FIG. 2, cutter motors 2 provide power for the two, spaced band saws 3 which run between motor pulleys 4 and idler pulleys 5, the latter of which are mounted relatively vertically movably to the framework 1. Screws 24 allow for the idler pulleys 5 to be vertically adjusted to hold the band saws 3 under spring tension away from the motor pully wheels 4.

Control motor 6 (note FIGS. 1 & 8) mounted on stand 1 serves to power a gear box 9, which in turn powers a cam shift 10 and drive shafts 8. Gear ratios in the gearbox 9 may be varied so as to vary the rates of revolution of the shafts 8 and 10 relative to each other.

Figure 9:
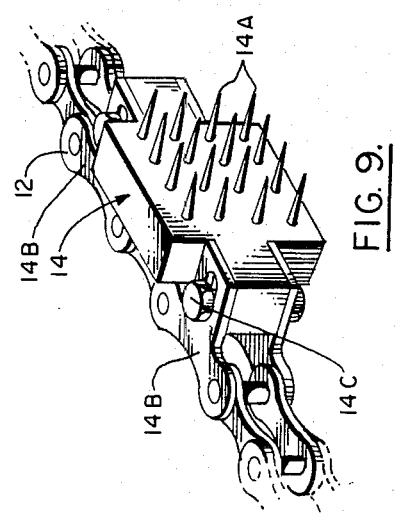
FIG. 9 is a close-up, perspective view of one of the toothed plates of the machine which are mounted on the chains of the conveyor system to grasp and hold the fish.

Drive shafts 8 turn gears 11 which drive conveyor chains 12, which run between sprockets 11 and sprockets 13, gears 13 being axially movably mounted on frame 1. Toothed gripping plates 14 are mounted on chains 12 in such a way that the plates 14 (shown in close-up in FIG. 9) on one chain 12 will constantly mirror the position of plates 14 on the other, opposed chain 12.

Figure 6:
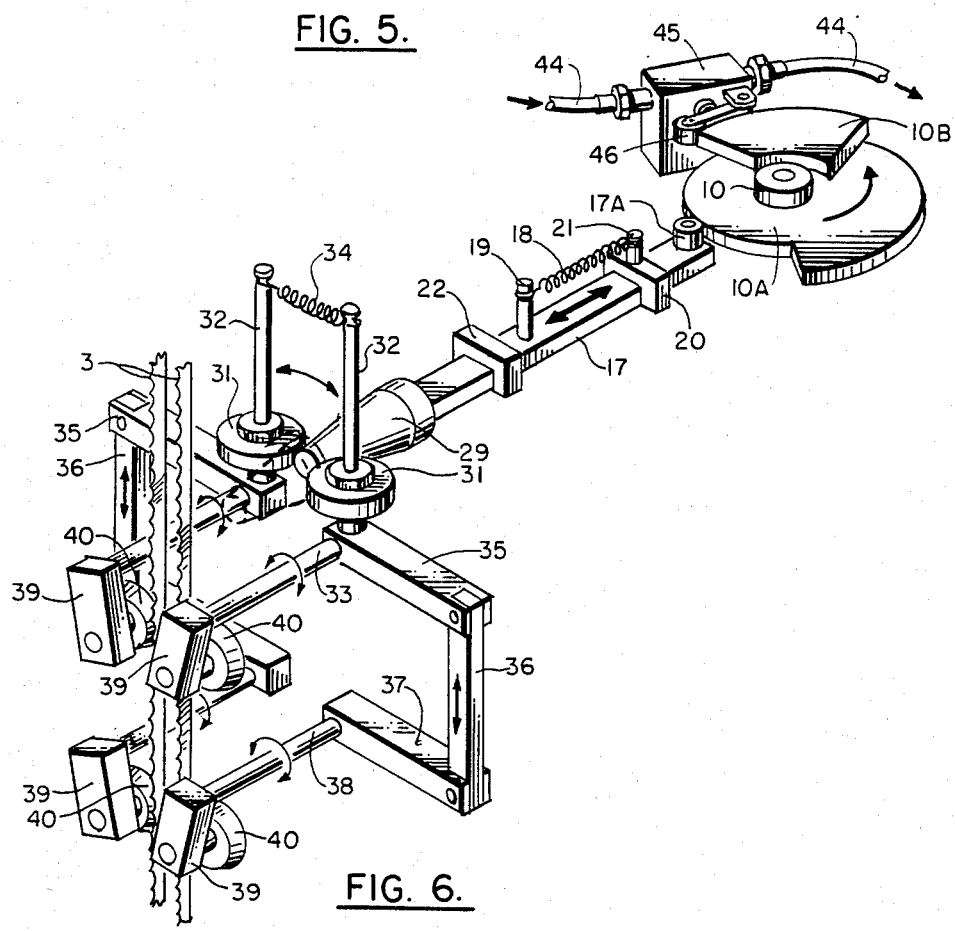
FIG. 6 is a perspective, cut-away view of the cam controlled adjustment system for the guide wheels for the blades of the machine.

As can best be seen in FIG. 6, cam shaft 10 is equipped with two cam sections 10A and 10B. "Jump" cam 10A is a cam section with a diameter which steadily increases before "jumping" back to its smallest diameter. Cam section 16 is of constant diameter throughout its section and can be mounted on cam shaft 10 or on the top of cam 10A. For purposes of illustration, the latter arrangement is used herein.

As will be described more fully below, cam section 10A mechanically controls the cant of and lateral spacing between the band saw blades 3, while cam section 10B controls the movement of the initial gripping pins 54 discussed below.

A longitudinally moveable trigger arm 17 has one end adjacent to the lower cam 10A, so that trigger 17A is in contact with cam 10A. Spring 18 is mounted on trigger arm 17 at spring attachment 19 and to sleeve 20 at spring attachment 21. Sleeve 20 is attached to the frame 1 fitting around trigger arm 17 and serves to brace trigger arm 17. Sleeve 22 is also mounted on frame 1 fitting around trigger arm 17 and serves to further brace trigger arm 17 near its far end.

Spring 18 provides pulling compression to assure that trigger 17A is always in contact with cam 10A. The end of trigger arm 17 farthest from cam 10A is fitted with a cone section 29. Cone 29 fits between radially, laterally movable rollers 31. Rollers 31 are in turn attached axially to bolts 32 (note FIG. 1).

As can best be seen in FIG. 6, as cam 10A revolves, its widening diameter causes trigger 17A to be pushed further away against spring 18 from brace 20. As the trigger arm 17 is moved away, it pushes the cone 29 between rollers 31, moving the rollers 31 laterally apart. Spring 34 between the bolts 32, which provides pulling tension to keep the rollers 31 biased toward each other, is also pushed apart. Top spindles 33 are held by brackets 41 (shown in FIG. 1) so as to be fixed except to be rotationally free along their central axis, brackets 41 being attached to frame 1 on the back side of front panel 1A. Top drive levers 35 are attached pivotally to spindles 33 and to lower, traveling connecting levers 36, which are in turn connected to lower drive levers 37. Lower drive levers 37 are in turn fixedly attached to rotatable lower spindles 38.

In this way, as trigger arm 17 is pushing between rollers 31, top spindles 33 are rotated along their axis driving top drives 35 which in turn drive connecting levers 36, which in turn drive lower drive levers 37, causing a corresponding rotation of the lower spindles 38.

Guide wheels 40 with beveled guide surfaces (note FIG. 4) of preferably two to three degrees of inward beveling or cant (note angle "alpha") are rotatably mounted on their central axes on one end of lever arms 39. The lever arms 39 on their other end in turn are fixedly mounted on both the upper spindles 33 and the lower spindles 38, so that the lever arms 39 hold the guide wheels 40 a pre-determined maximum distance apart when trigger arm 17 is fully withdrawn and the rollers 31 are held closest together by biasing spring 34.

In this way, as rollers 31 are pushed apart by the trigger arm 17, spindles 33 and 38 rotate clockwise (as one faces front panel 1A) rotating levers 39, causing the beveled wheels 40 to move laterally inwardly, decreasing the distance between the wheels. As trigger arm 17 is withdrawn by spring 18 at the jump in the cam cycle of cam 10A, spring 34 pulls the rollers 31 back together, turning spindles 33 and 38 counter-clockwise (as one faces front panel 1A), rotating the top and bottom sets of guide wheels 40 back away from each other on lever arms 39.

Referring to FIG. 2, it can be seen that the band saw blades 3 running between pulleys 5 and 4 also run between and inboard of the two sets of guide wheels 40. The blades are thereby canted inwardly toward the incoming fish by the beveled surfaces on the guide wheels 40 and are spaced between top and bottom sets of guide wheels 40 corresponding to the spacing between the guide wheels. In this way, the motion of cam 10A controlled by gearbox 9 controls the lateral spacing and canting of the band saw blades 3. The amount of cant should be of the order of a few degrees, preferable two to three degrees.

Figure 8:
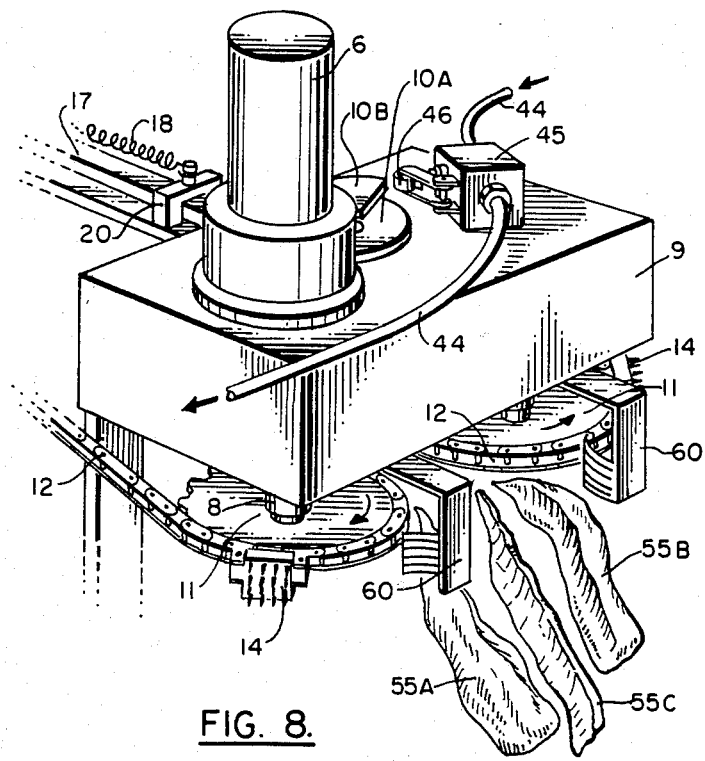
FIG. 8 is a perspective, end, partial view of the machine showing the cam controlled blade biasing sub-system and the air pressure line cut-off valve sub-system and the scrappers for removing the fillets from the conveyor system.

As can best be seen in FIG. 8, air line 44 passes through an on-off pressure valve 45, which is mounted on frame 1 next to the cam shaft 10.

Valve 45 is equipped with a "push" on-off switch 46. Switch 46 is mounted above cam 10A, so that cam 10A does not make contact with it. Cam 10B, being raised, does make contact with switch 46. Switch 46 is compressed opening valve 45 over the expanded diameter segment of cam section 10B. Switch 46 returns to the closed or off position when cam 10B reaches its reduced diameter segment. When switch 46 is held "open" by cam 10B, pressurized air is allowed to pass through pressure line 44 to drive piston 47 which is mounted on the front panel 1A.

Figure 7:
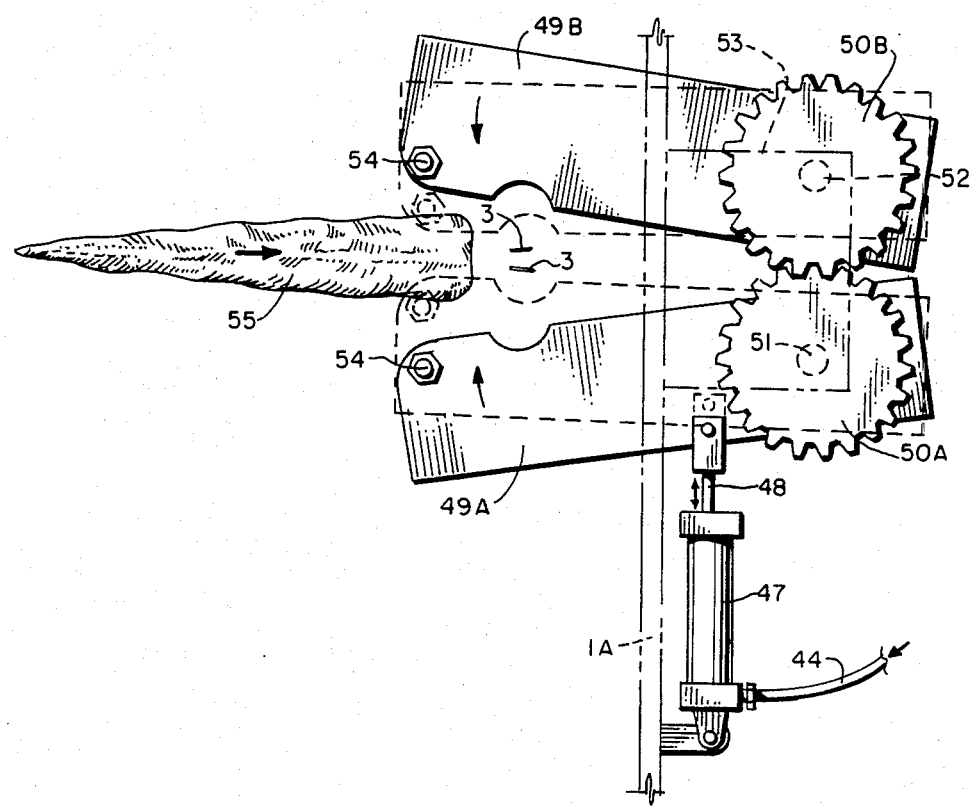
FIG. 7 is a plan, sectional, partial view of the entry portion of the machine where the headless fish body is held by vertical pins prior to being grasped by lateral pin means on the chains of the conveyor, with the view being taken along section lines 7—7 in FIG. 1.

As can best be seen in FIG. 7, the piston 47 drives arm 48 out when pressurized. Piston arm 48 is pivotally attached to bars 49A behind front plate 1A. Bars 49A and 49B are each mounted rotationally movably on axis 51 and 52, respectively, which are mounted immovably and perpendicularly on plate 53, which is in turn mounted immovably and perpendicularly on the front frame 1a. Gear 50A is affixed to bar 44A over axle 51. Gear 50A is constantly meshed with gear 50B, which is affixed to bar 49B over axle 52. In this way every movement of bar 49A is mirrored by 49B.

Bars 49A and 49B extend through the opening in the front plate 1A of the frame 1 between the guide wheels 40. Grooves or indentations (note FIG. 7) are cut in bars 49A and 49B at the point where the band saw blades 3 pass at their internal orbit. The grooves prevent bars 49A and 49B from closing together against the blades 3.

Pins 54 are attached perpendicularly to bars 49A and 49B at their ends opposite from gears 50A and 50B and extend downwardly to just above the guides 43 on middle plate 16 where it extends in front of the front plate 1A (note FIG. 1).

As cam 10B opens valve 45 (shown in FIG. 8), piston 47 is pressurized extending arm 48, which moves bar 49A causing a corresponding mirror movement of bar 49B due to the action of intermeshing gears 50A and 50B. Bars 49A and 49B move toward each other moving pins 54 together. The fish 55 is thereby securely held, properly centered between the pins 54.

As illustrated in FIG. 3, the vertical pins 54 hold the fish (note dashed lines) 55 until the toothed plates 14 come around the sprocket gears 13 on conveyor chains 12, at which point they grab the fish body 55 and carry it longitudinally through and past the cutting blades 3, pins 54 at the beginning of this process helping to steady the fish. The pins 54 then separate as cam 10B releases switch 46, allowing, as shown in FIG. 7, the piston arm 48 to retract by means of for example a spring located inside piston 47. This action pulls the pins 54 apart by pulling back bar 49A, which action in turn, through gears 50A and 50B, pulls back bar 49B, allowing the easy insertion of the next fish by the operator.

Referring again to FIG. 3, the toothed plates 14 are spaced on the chains 12 to correspond to the length of the fish being processed. Also, the gears in gearbox 9 may be easily changed to provide that the cam 10A and 10B turn at rates corresponding to the spacing of the fish as delivered by means of the toothed plates 14 on the chains 12.

Referring to FIG. 8, it can be seen that, as a fish 55 leaves the area of the middle plate 16 of frame 1A, the two cut fillets 55A, 55B are carried by the plates 14 laterally away from the central bone section 55C and are then removed by scrappers 60 attached to the gear box 9 of frame 1 for this purpose.

Band saw blades 3 preferably are scallop blades of the type designed for cutting bread. This type of blade has been found to be superior to any other type of blade for filleting fish using the present system of beveled guide wheels 40 inwardly canting the blades 3.

As can best be seen in FIGS. 1 & 2, water line 58 runs to a downwardly disposed faucet or spray nozzle 57. The spray nozzle 57 is mounted on frame 1 over the inner orbit of saw blades 3. The spray nozzle 57 can be run continuously or intermittently during the cutting process, so that the cutting area and blades 3 remain clean to keep the cutting area sanitary and to prevent the blades 3 from becoming snagged and twisted.

In operation, a de-headed, cleaned fish body 55 is placed on the guides 43 at the entry end of the machine 1. The vertical pins 54 are automatically pulled together laterally and vertically engaging the fish 55 and holding it up centrally on the guides 43.

The next set of opposed, "needle" pins 14A moving along on the endless conveyor chains 12 engages the forward end of the fish body, pulling it into and past the vertically moving cutting blades 3, which are canted inwardly during the cutting process under the pressure of the laterally moving guide wheels 40. It should be noted that, as the gripping plates 14 round the sprocket gears 13, the pointed pins 14A pierce the sides of the fish body firmly engaging and holding it as they pull and move the fish longitudinally through the machine 1.

The vertical pins 54 are automatically moved out to await the placement of the next fish to be processed.

Figure 5:
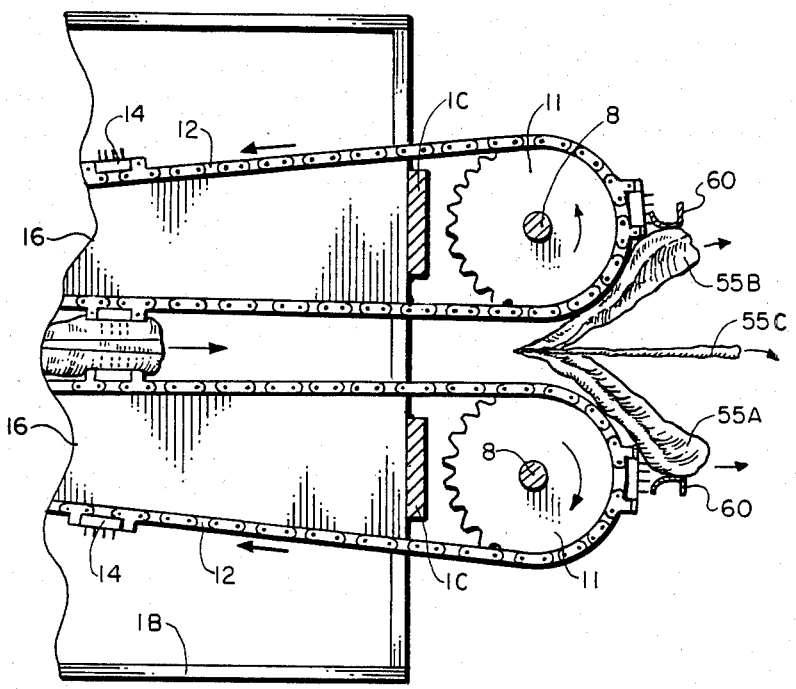
FIG. 5 is a sectional, partial view of the conveyor at the exit area of the machine opposite where the fish is initially grasped by the chain drive of FIG. 3, showing the cut fillets separating from the bone at the machine's exit end.

As the cut fish reaches the exit end (note FIGS. 5 & 8) the "needle" pins 14A in firm engagement with the cut fillets 55A, 55B pull them laterally away from the central bone section 55C, as the gripping plates 14 move around the sprocket gears 11. The central bone section 55C falls down under the force of gravity into a catch basin (not shown), while the two fillets which have moved off to the sides are pushed off the "needle" pins 14A by the curved deflector plates 60. The fillets 55A, 55B then fall down under the force of gravity into their respective catch basins (not shown).

Of course, like most mechanical systems, many changes in dimensions, arrangements, and structure are possible within the scope of the inventive concept taught and disclosed herein.

Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. A fish filleting machine, comprising: cutting means for cutting the fish fillets from the central bone section of the fish, said cuttoing means comprising a pair of opposed, moveable band saw blades spaced apart a distance comparable to the thickness of the central bone section of the fish, the cutting edges of said blades being canted toward each other and the incoming fish during the cutting process, the leading cutting edge of said blades being canted inwardly toward the centerline with respect to their own adjacent backside, trailing edges, the amount of cant being of the order of a few degrees;

at least one opposed pair of rotatable guide wheels mounted adjacent to said saw blades but removed from the area where the fish contact said blades during the cutting process, said band saw blades being mounted for travel in contact with said opposed pair of rotatable guide wheels, the axes of rotation of said guide wheels being directed at least generally parallel to the direction of relative travel between the fish and the blades during the cutting process and located out board of said blades, the blade contacting surfaces of said guide wheels being canted forwardly at least during the cutting process an amount of the order of a few degrees causing said blades to be canted inwardly an amount of the order of a few degrees: and conveyor means associated with said cutting means for positioning and moving the fish and said cutting means relative to one another in cutting engagement during the cutting process.

2. The machine of claim 1, wherein the amount of cant of each blade is between two to three degrees.

3. The machine of claim 1, wherein there is included two opposed pairs of said guide wheels, one pair being positioned above and the other below the fish contact area of said blades.

4. The machine of claim 1, wherein said guide wheels are moveably mounted on said machine, the axes of rotation of said guide wheels being laterally moveable with respect to said saw blades, causing said blades to be moved inwardly toward each other, lessening the thickness of the central cut as said guide wheels and hence said blades are moved laterally and inwardly toward each other.

5. The machine of claim 3, wherein said guide wheels are movably mounted on said machine, the axes of rotation of said guide wheels being laterally moveable with respect to said saw blades, causing said blades to be moved inwardly toward each other lessening the thickness of the central cut as said guide wheels and hence said blades are moved laterally and inwardly toward each other.

6. The machine of claim 1, wherein said conveyor means comprises a pair of longitudinally moveable, opposed, endless conveyor means extending from a fish entry area forward of said blades to a fish fillet and central bone section exit area aft of said blades, said endless conveyor presenting inwardly directed, opposed, fish engaging surface means for engaging the fish, holding it up and moving it into and past said blades during the cutting process.

7. The machine of claim 6, wherein said fish engaging surface means includes a series of opposed, longitudinally spaced fish gripper areas, each of said fish gripper areas including a multiple number of laterally directed, pointed pins which engage and firmly hold its respective side of the fish in the conveying process.

8. The machine of claim 7, wherein there is further included:

scraper means located adjacent to the aft, exit end of said conveyor means, one of each side of the operative centerline of the machine, for removing the fish fillets from the pins of said fish engaging surface means.

9. The machine of claim 1, wherein there is further included:

movement means connected to said guide wheels for twisting the blades in canting the blades, said movement means including a rearwardly and forwardly reciprocating cone shaped element located on the centerline of the machine and a pair of rollers mounted adjacent to and in rolling contact with opposite sides of the tapered sides of said cone shaped element, the reciprocating movement of the cone shaped element causing said guide wheels to be moved inwardly and outwardly in contact with the sides of said blades with respect to the operative centerline of the machine.

10. The machine of claim 1, wherein there is further included:

a pair of vertically disposed, opposed contact pins located adjacent to and forward of said blades; and mounting means attached to said pins and located on opposite sides of the operative centerline of the machine for moving said pins inwardly and outwardly with respect to the operative centerline of the machine, said pins initially contacting and holding the sides of an incoming fish body before the fish body is operatively engaged by said conveyor means.

11. The machine of claim 10, wherein:

said mounting means is mounted for pivoting about vertical axes located aft of said blades, said mounting means having an indented, open area fitting about said blades when said mounting means moves said pins inwardly.

12. The method of filleting fish on an automated basis with the use of a pair of opposed band saw blades spaced apart a distance comparable to the thickness of the central bone section of the fish, including the following steps:

(a) canting the cutting edges of the blades inwardly toward each other and the incoming, forwardly fed fish during the cutting process so that the leading cutting edges of said blades are canted inwardly toward the operative centerline of the machine with respect to their own adjacent backside, trailing edges in an amount of the order of a few degrees; and (b) causing the cutting edge to move along the central bone section to closely cut the fillets away from the central bone section of the fish as the fish and the cutting edges of the blades are moved relative to each other in cutting engagement the full length of the fish body.

13. The method of claim 12, wherein there is included in step "a" the step of:

canting the blades inwardly an amount between two to three degrees during the cutting process.

14. The method of claim 12, wherein there is further included the step of:

exerting on said blades laterally and inwardly directed pressure toward each other during the cutting process to twist the leading cutting edges inwardly toward the operative centerline of the machine with respect to their own adjacent backside, trailing edges.

15. The method of claim 13, wherein in the step of twisting the blades inwardly there is further included the step of:

using laterally moveable guide wheels and laterally moving said guide wheels into pressure contact with said blades exerting on said blades laterally and inwardly directed pressure toward each other during the cutting process.

16. The method of claim 12, wherein there is further included the steps of:

conveying the fish by means of laterally opposed, longitudinally moving, endless conveyor means having a series of longitudinally spaced fish gripper areas having a multiple number of laterally directed pointed pins which engage and hold the fish sides in the conveying process, the pins at least in part slightly piercing the outer surface of the fish; and separating the cut fillets from the central bone section by moving said endless conveyor means laterally further apart at the conveyor exit area with said pointed pins in piercing engagement with the fillets causing the fillets to be pulled laterally away from their respective central bone sections, the central bone sections being allowed to fall down away from the separated fillets.

* * * * *